Feb. 11, 1969 W. B. BRIDGES ET AL 3,427,567
GASEOUS LASER DISCHARGE TUBE
Filed May 19, 1967 Sheet 1 of 2

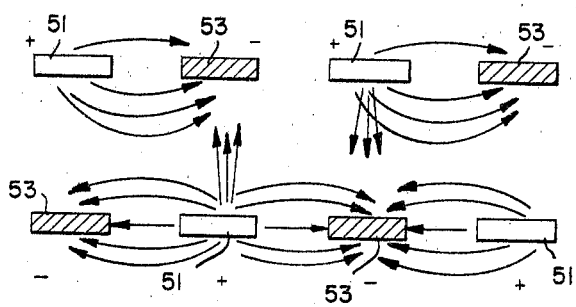
Fig. 3.
Fig. 6.
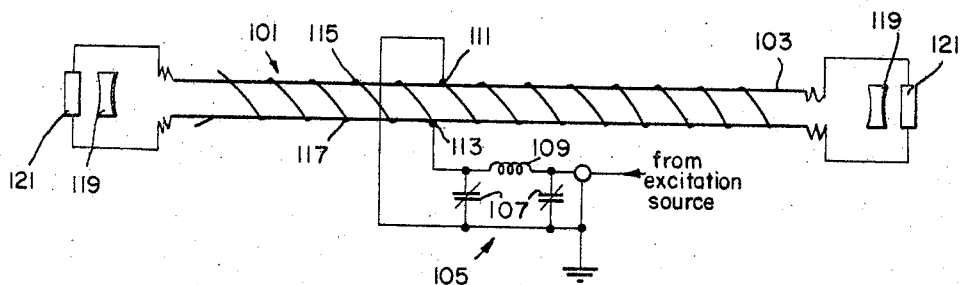
Fig. 7.
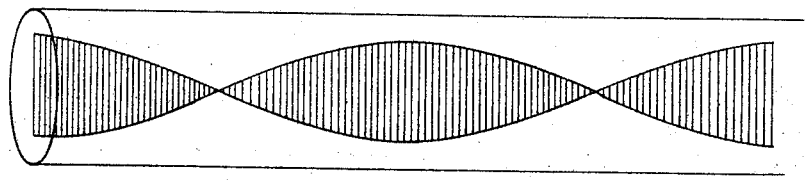
William B. Bridges,
Peter O. Clark,
INVENTORS.
BY.
ATTORNEY.

United States Patent Office 3,427,567
Patented Feb. 11, 1969

3,427,567
GASEOUS LASER DISCHARGE TUBE
William B. Bridges, Thousand Oaks, and Peter O. Clark, Malibu, Calif., assignors to Hughes Aircraft Company, Culver City, Calif., a corporation of Delaware
Filed May 19, 1967, Ser. No. 642,647
U.S. Cl. 331—94.5                8 Claims
Int. Cl. H01s 3/00, 3/22

ABSTRACT OF THE DISCLOSURE

This is a gaseous laser wherein a novel electrode arrangement is used for exciting a gaseous discharge. The laser comprises an elongated plasma container of a material through which electromagnetic energy of a desired frequency may propagate and wherein a gas to be excited is disposed. The novel electrode arrangement takes the form of a bifilar helix electrode configuration disposed about the container along substantially the length thereof. The electrode configuration is provided with terminals whereat alternating current electromagnetic energy at the desired frequency and of sufficient magnitude may be connected in order to excite the gas and cause a laser discharge.

---

The invention herein described was made in the course of or under a contract or subcontract thereunder with the United States Air Force.

There has long been a need in the field of gaseous lasers for a means whereby a uniform excitation of the gas can be assured. Nonuniformity leads to low efficiency and unreliability of performance. The problem arises because it is difficult under some conditions of size, shape and gas pressure to achieve the desired uniform excitation of the electrical discharge.

In the past, attempts have been made to overcome this problem but to date none has proven very successful. The most widely used of such arrangements consisted of disposing uniformly spaced conducting rings or bands along the length of the gas container and connecting each terminal of a radio frequency power source to alternate of such terminals. This arrangement has been tried in conjunction with the excitation of the higher power $CO_2-N_2$ gas lasers and found to be quite unsatisfactory.

In contrast to the prior gas laser discharge art as described above, the invention has the advantage of providing a more uniform excitation of the gas in a gaseous laser discharge.

Accordingly, it is an object of the present invention to provide an improved gaseous laser.

It is another object of the invention to provide a high power gas laser that has improved discharge characteristics.

It is still another object of the invention to provide a reliable high power gaseous laser discharge tube having high efficiency.

These and other objectives are achieved, according to the invention, in a gaseous laser discharge tube comprising an elongated plasma container of the material through which electromagnetic energy of the desired frequency may propagate and which contains a gas to be excited. The invention also includes a bifilar helix electrode configuration disposed about the gaseous container along substantially the length thereof and the electrode configuration is provided with terminals whereat alternating current electromagnetic energy at the desired frequency and of sufficient magnitude may be connected in order to excite the gas within the container.

The invention and specific embodiments thereof will be described hereinafter by way of example and with reference to the accompanying drawings wherein like reference numerals denote like elements or components and in which:

FIG. 3 is a schematic illustration of the field distribution between the bifilar helix conductors;

FIG. 6 is a schematic diagram illustrating an actual embodiment constructed and successfully demonstrated using $CO_2-N_2$ gas as the active laser material; and FIG. 7 is a schematic illustration of the discharge as it appeared when the embodiment of FIG. 6 was energized.

Figure 1:
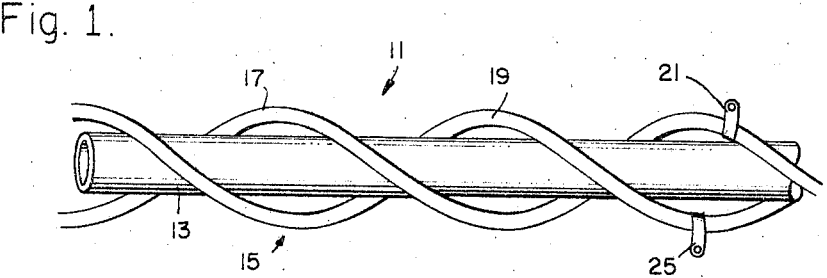
FIG. 1 is a schematic diagram of one embodiment of the invention showing the bifilar helical conductors wrapped about a gas discharge tube.

With reference to the drawings and more particularly to FIG. 1, there is shown a portion of a gaseous laser 11 according to the invention comprising a cylindrical gas or plasma container or discharge tube 13 that may be filled with a gas or mixture of gases such as $CO_2-N_2$, not shown. The container 13 may be fabricated from a material such as glass, ceramic or quartz or other suitable material that has gas holding properties and through which electromagnetic energy of a predetermined frequency may propagate. A bifilar helix electrode configuration 15 made up of a first helical wound wire electrode 17 and a second helical wound wire electrode 19 is mounted around the container 13 along substantially the length thereof.

The gas within the container 13 is excited to a lasing or population inversion state by causing an electric discharge in the gas. The discharge causes ions and free electrons to form. These act as current carriers and are accelerated by the field that creates the discharge and acquire a kinetic energy. The electrons acquire energy from the excitation source, such as a radio-frequency (RF) generator (not shown in FIG. 1), usually operating in the 25– to 30– mc. region. This source is coupled to the bifilar helix electrode configuration 15 by means of wires connected to terminals 21 and 23 attached to wire electrodes 17 and 19, respectively. The energy acquired by the electrons is distributed when electrons so excited encounters gas atoms in inelastic collisions in which the atoms either gain or lose energy. This process will cause a population inversion from which the most probable transition will cause the emission of radiation when the atoms pass from high-energy states to lower-energy states.

Figure 2:
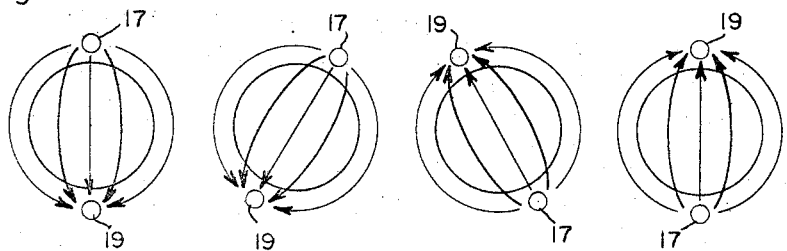
FIG. 2 shows the electric field distribution for various axial positions along the gas discharge tube of FIG. 1 as caused by the bifilar helical conductors when energized.

The uniformity of excitation along the discharge tube depends largely on the method used to excite the gas. When alternating current (usually RF) is applied to the wire electrodes 17 and 19 as indicated above, the electric fields thus created extend from one electrode to the other through the container 13 as shown in FIGS. 2 and 3 for various axial positions along the container, for example. The direction of the electric field, it can be seen, twists with the twist of the helix but remains uniform along the axis of the container.

Figure 4:
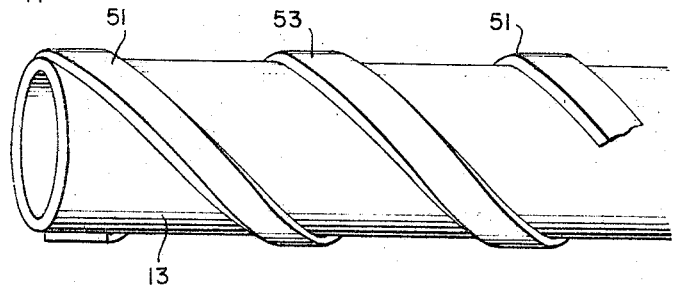
FIG. 4 is a schematic diagram of another embodiment of the invention wherein the conductors have a flat tape cross section.
Figure 5:
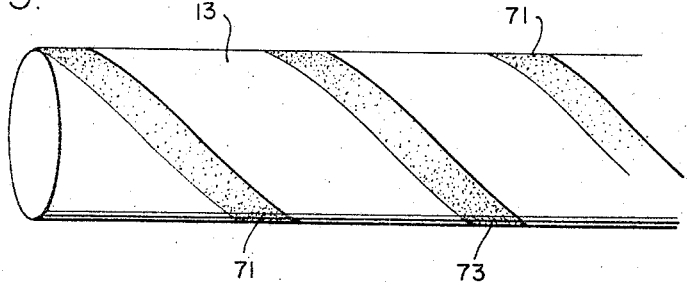
FIG. 5 illustrates still another embodiment of the invention wherein the conductors are thin metallic deposits on the outer surface of the discharge tube.

The helical wound electrodes of the bifilar electrode configuration 15 may be of any cross section, such as the round wire electrodes 17 and 19 of FIG. 1, flat tape electrodes 51 and 53 shown in FIG. 4, and deposited conductive layers 71 and 73 of FIG. 5. The tape cross section helix configuration is probably the easiest to fabricate in conjunction with the discharge tube or container 13. The pitch of the helical wound electrodes is not critical but an optimum pitch is approximately two tube diameters as shown in FIG. 3.

A schematic representation of a working laser constructed according to the invention is shown in FIG. 6. The bifilar helix electrode configuration 101, similar to the helix configuration 15, was wound about a conventional $CO_2$-$N_2$ laser discharge tube 103. An RF excitation source was coupled through a conventional pi-section impedance matching network 105, comprised of capacitors 107 and inductor 109, to two terminals 111 and 113 connected to individual helical wound wire electrodes 115 and 117, respectively, of the bifilar configuration 101. The pitch in this particular case was two tube diameters and the laser beam was produced in the region between two reflectors 119 making up a resonant cavity. The infrared energy thus generated was allowed to pass through an aperture in one of two gas retaining but infrared transparent sodium chloride windows 121. Approximately 4 watt laser output was obtained with as little as $\pm$60 watts of RF excitation at 28 mc. The overall discharge tube length was 150 cm.; the active region of the tube had a length of 120 cm. over which the bifilar helical electrode was positioned; the tube inside diameter was 2.5 cm.; and the discharge tube was fabricated from glass tubing.

The discharge appeared to be in the form of a twisted tape down the center of the tube as shown in FIG. 7 and the intensity was uniform.

From the foregoing, it can be seen that there has been described an improved gaseous laser capable of handling high power discharges with good discharge characteristics and providing high efficiency.

Although only a few specific embodiments of the invention have been described, it will be appreciated that other organizations of the specific arrangements shown may be made within the spirit and scope of the invention. For example, the type of gas and the material used as the gas container may be changed to a gas or gases or material exhibiting similar general characteristics. Also, the type and frequency of RF excitation can be modified.

Accordingly, it is intended that the foregoing disclosure and the showings in the drawings shall be considered only as illustrations of the principles of this invention and are not to be construed in a limiting sense.

What is claimed is:
1. A gaseous laser discharge tube, comprising:
   an elongated plasma container of a material through which electromagnetic energy of a desired frequency may propagate;
   a gaseous medium to be excited disposed within said container; and
   means disposed about said container for establishing within said container an electric field having a helicoid shape to excite said gaseous medium within said container.

2. The laser discharge tube of claim 1 wherein said means for establishing an electric field comprises:
   an interwound bifilar helix electrode configuration including two helically wound electrodes disposed substantially along the length of said container, each of said electrodes having a single terminal electrically connected thereto to form a terminal pair, so that application of alternating current energy to said terminal pair creates said electric field.

3. The laser discharge tube of claim 2 wherein said electrodes are wire electrodes.

4. The laser discharge tube of claim 2 wherein said electrodes are flat tape electrodes.

5. The laser discharge tube of claim 2 wherein said electrodes are deposited conductive layers.

6. The laser discharge tube of claim 2 wherein said gaseous medium is $CO_2$-$N_2$.

7. The laser discharge tube of claim 2 further including:
   regenerative resonant cavity means disposed about the length of said plasma container for providing a regenerative path through said container in order to produce a laser beam when said gaseous medium is excited.

8. The laser discharge tube of claim 6 further including:
   a pair of reflectors disposed adjacent the ends thereof to provide a regenerative path through the container, at least one of said reflectors being adapted to transmit a portion of any energy produced along said regenerative path.

References Cited

UNITED STATES PATENTS

| | | | |
|---|---|---|---|
| 2,003,898 | 6/1935 | Mitscherling | 313—201 X |
| 2,943,223 | 6/1960 | Fay | 313—201 |
| 3,109,141 | 10/1963 | Blackwell | 313—201 X |
| 3,248,548 | 4/1966 | Booth et al. | 331—94.5 X |
| 3,265,989 | 8/1966 | Gurs | 331—94.5 |

OTHER REFERENCES

Gerritsen et al., Laser Induction Pumping, RCA Technical Note No. 606, March 1965.

Kovacs et al., Q Switching of Molecular Laser Transitions, in Applied Physics Letter, vol. 8, No. 3, February 1966, p. 62 relied on.

RODNEY D. BENNETT, *Primary Examiner.*

D. C. KAUFMAN, *Assistant Examiner.*